United States Patent
Sugimura

(10) Patent No.: US 12,534,873 B2
(45) Date of Patent: Jan. 27, 2026

(54) WORK VEHICLE

(71) Applicant: HONDA MOTOR CO., LTD., Tokyo (JP)

(72) Inventor: Kentaro Sugimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 18/250,624

(22) PCT Filed: Oct. 30, 2020

(86) PCT No.: PCT/JP2020/040852
§ 371 (c)(1),
(2) Date: Apr. 26, 2023

(87) PCT Pub. No.: WO2022/091352
PCT Pub. Date: May 5, 2022

(65) Prior Publication Data
US 2023/0399814 A1 Dec. 14, 2023

(51) Int. Cl.
*E02F 9/08* (2006.01)
*E02F 3/32* (2006.01)

(52) U.S. Cl.
CPC .......... *E02F 9/0858* (2013.01); *E02F 3/325* (2013.01)

(58) Field of Classification Search
CPC ......... E02F 9/0858; E02F 3/325; E02F 9/207; E02F 9/18; B60K 1/04; B60K 2001/0416;
(Continued)

(56) References Cited

U.S. PATENT DOCUMENTS 3,787,086 A * 1/1974 Cosby .................. B62D 49/085
296/65.13
6,056,077 A * 5/2000 Kobayashi ............. B62K 5/007
280/786
(Continued)

FOREIGN PATENT DOCUMENTS

CN 103068717 A * 4/2013 ............... B60K 1/04
EP 1 092 621 A2 4/2001
(Continued)

OTHER PUBLICATIONS

Translated WO-2019064593-A1 (Year: 2025).*
(Continued)

*Primary Examiner* — James A Shriver, II
*Assistant Examiner* — Ian Bryce Shelton
(74) *Attorney, Agent, or Firm* — Rankin, Hill & Clark LLP

(57) ABSTRACT

A work vehicle includes an electric drive source, and a vehicle main body part to which a traveling part is provided. The vehicle main body part includes: a loading part that extends in a first direction and that can operate with respect to the vehicle main body part; and a removable battery storage unit that extends in a second direction which is the reverse direction of the first direction. The loading part loads an object to be loaded. The removable battery storage unit includes a storage section capable of storing a removable battery. An opening is formed in an upper part of the storage section. The opening is oriented upward, and an axis line along a battery attachment/removal direction of the storage section is inclined so as to be oriented in the first direction or the second direction.

11 Claims, 4 Drawing Sheets

(58) Field of Classification Search
CPC .... B60K 2001/0466; B60K 2001/0455; B60K 2001/0494; B60Y 2200/412; B60Y 2200/415
See application file for complete search history.

(56) References Cited

U.S. PATENT DOCUMENTS

| | | | | |
|---|---|---|---|---|
| 8,100,210 | B2 * | 1/2012 | Takeuchi | H01M 10/052 180/68.5 |
| 11,102,928 | B2 * | 8/2021 | Uemura | B60K 1/04 |
| 11,273,716 | B2 * | 3/2022 | Matsuda | A01D 34/78 |
| 11,725,363 | B2 * | 8/2023 | Gorman | E02F 9/2075 180/291 |
| 11,821,166 | B2 * | 11/2023 | Springer | E02F 9/207 |
| 12,120,982 | B2 * | 10/2024 | Uemura | B62B 5/0003 |
| 12,252,866 | B2 * | 3/2025 | Vollmar | E02F 9/0833 |
| 2007/0072063 | A1 * | 3/2007 | Imashige | B62D 25/10 429/96 |
| 2009/0314557 | A1 * | 12/2009 | Takeuchi | B60K 1/04 180/65.1 |
| 2012/0181097 | A1 | 7/2012 | Hatanaka et al. | |
| 2013/0078071 | A1 * | 3/2013 | Noguchi | B60K 1/04 414/719 |
| 2015/0139768 | A1 * | 5/2015 | Egawa | B66C 23/74 414/719 |
| 2018/0226701 | A1 * | 8/2018 | Inoue | H01M 10/6561 |
| 2019/0014718 | A1 * | 1/2019 | Uemura | B60K 1/04 |
| 2020/0001729 | A1 * | 1/2020 | Matsuyama | B60L 50/66 |
| 2020/0274119 | A1 * | 8/2020 | Okubo | B62J 43/16 |
| 2020/0290465 | A1 * | 9/2020 | Matsuda | B60K 1/04 |
| 2021/0345550 | A1 * | 11/2021 | Uemura | B62B 5/0003 |
| 2022/0025609 | A1 * | 1/2022 | Springer | B62D 21/186 |
| 2022/0034064 | A1 * | 2/2022 | Gorman | E02F 9/0808 |
| 2022/0074163 | A1 * | 3/2022 | Terashima | B60L 58/18 |
| 2023/0103926 | A1 * | 4/2023 | Vollmar | B60L 50/66 37/347 |
| 2023/0109143 | A1 * | 4/2023 | Vollmar | E02F 9/0891 414/697 |

FOREIGN PATENT DOCUMENTS

| | | | | |
|---|---|---|---|---|
| EP | 1389552 | A1 * | 2/2004 | B60K 1/04 |
| FR | 3018797 | A1 * | 9/2015 | B66C 23/74 |
| JP | S61-114661 | U | 7/1986 | |
| JP | H10112358 | A * | 4/1998 | |
| JP | H10203459 | A * | 8/1998 | |
| JP | 2001-106148 | A | 4/2001 | |
| JP | 2007092455 | A * | 4/2007 | B62D 25/10 |
| JP | 2008190245 | A * | 8/2008 | |
| JP | 2013164979 | A * | 8/2013 | |
| JP | 2013-177119 | A | 9/2013 | |
| JP | 2014-134055 | A | 7/2014 | |
| JP | 2019-068720 | A | 4/2019 | |
| JP | 2020004683 | A * | 1/2020 | B60L 50/66 |
| JP | 2020097867 | A * | 6/2020 | B21J 15/105 |
| JP | 2020103129 | A * | 7/2020 | |
| KR | 10-2012-0082342 | A | 7/2012 | |
| WO | WO-2011158686 | A1 * | 12/2011 | B60K 1/04 |
| WO | WO-2013183443 | A1 * | 12/2013 | B66C 23/74 |
| WO | WO-2019064593 | A1 * | 4/2019 | B60K 1/04 |
| WO | WO-2019146667 | A1 * | 8/2019 | B60K 1/04 |
| WO | WO-2019194009 | A1 * | 10/2019 | |
| WO | WO-2020054092 | A1 * | 3/2020 | B60K 1/04 |

OTHER PUBLICATIONS

Translated WO-2019194009-A1 (Year: 2025).*
Translated EP-1389552-A (Year: 2025).*
Translated JP-H10112358-A (Year: 2025).*
Translated JP-H10203459-A (Year: 2025).*
International Search Report, International Application No. PCT/JP2020/040852, Date of mailing: Jan. 19, 2021, 3 pages.
Japanese Office Action dated Aug. 22, 2023 issued in corresponding Japanese application No. 2022-558759; English machine translation included (7 pages).
Japanese Office Action dated Dec. 12, 2023, Japanese Application No. JP 2022-558759, English translation included, 4 pages.

* cited by examiner

WORK VEHICLE

TECHNICAL FIELD

The present invention relates to a work vehicle including a loading unit on which a loaded object is loaded.

BACKGROUND ART

A work vehicle such as a hydraulic excavator, a tractor shovel, or a forklift includes a vehicle body provided with a seat for a driver (operator), and a loading unit provided so as to extend from an outer wall surface of the vehicle body. For example, a loaded object such as earth and sand or cargo is loaded on the loading unit. In recent years, attempts have been made to employ, as a traveling drive source for this type of work vehicle, a motor driven by electric power supplied from a battery.

For example, JP 2008-190245 A discloses a hydraulic excavator in which a battery box is provided in the vicinity of a seat on which an operator is seated. When a back side of the operator seated on the seat is defined as a rear side, and a side opposite thereto is defined as a front side, the battery box is disposed rearward of the seat. In order to facilitate replacement of the battery with a new battery when the capacity of the battery has decreased, the battery box is supported by a battery box lifting and lowering unit that pivots so as to approach or separate from the ground.

SUMMARY OF THE INVENTION

In a hydraulic excavator, a bucket is provided forward of a seat. When loaded objects such as cargo, earth and sand, or rocks are loaded on the bucket, the weight of the front portion of the hydraulic excavator becomes considerably large. That is, the weight is unbalanced between the front portion and the rear portion of the hydraulic excavator. As a result, the posture of the work vehicle may become unstable.

A main object of the present invention is to provide a work vehicle capable of maintaining a stable posture even when a loaded object is loaded on a loading unit.

According to an embodiment of the present invention, there is provided a work vehicle comprising: an electric drive source driven by electric power; a traveling unit driven by the electric drive source; a vehicle body on which the traveling unit is provided; a loading unit that is provided on the vehicle body so as to extend in a first direction, is configured to allow a loaded object to be loaded thereon, and is operable with respect to the vehicle body; and a detachable battery storage unit provided on the vehicle body so as to extend in a second direction that is an opposite direction to the first direction, wherein the detachable battery storage unit includes a housing portion that is configured to house a detachable battery configured to supply electric power to the electric drive source, and an opening that is formed in an upper portion of the housing portion, the detachable battery being inserted or removed through the opening, and the opening is oriented upward, and an axis line of the housing portion that extends in a battery attachment/detachment direction is inclined so as to be oriented in the first direction or the second direction.

Here, the "opposite direction" means the other direction side with respect to one direction side, more specifically, a "reverse direction". For example, when the direction in which the operator faces is the first direction, the direction toward the back side of the operator is the second direction. In the case of a work vehicle in which the traveling unit includes a crawler, it is generally recognized that "the side on which the drive sprocket is disposed is the rear side". However, in the case where the vehicle body is provided so as to be pivotable with respect to the traveling unit, the direction in which the traveling unit faces and the direction in which the vehicle body faces may not coincide with each other. Therefore, in the present specification, the first direction and the second direction are defined based on the direction of the vehicle body.

According to the present invention, since the loading unit and the detachable battery storage unit are disposed on opposite sides, even when a loaded object is loaded on the loading unit and a load acts on the first direction side of the work vehicle, the load (or weight) can be substantially balanced between the first direction side and the second direction side. As a result, the posture of the work vehicle is prevented from becoming unstable, and various types of work such as excavation work and transportation work, for example, can be smoothly performed by the work vehicle.

In addition, the opening of the detachable battery storage unit is oriented upward, and the axis line, of the housing portion that houses the detachable battery, along the battery attachment/detachment direction is inclined so as to be oriented in the first direction or the second direction. Therefore, for example, the inner wall of the housing portion that faces downward receives a part of the weight of the detachable battery. That is, the housing portion bears the load of the detachable battery. Therefore, it is possible to reduce the force required when the operator pushes the detachable battery into the housing portion or pulls the detachable battery out of the housing portion, compared to a case where the axis line of the detachable battery storage unit extends in the vertical direction. In other words, the detachable battery can be easily attached to and detached from the housing portion.

In addition, since the detachable battery storage unit is inclined as described above, the center of gravity of the detachable battery storage unit can be easily separated from the loading unit toward the second direction side, compared to a state where the detachable battery storage unit is not inclined. As a result, it becomes easier to balance the weight of the loading unit (on the first direction side) on which the loaded object is loaded and the weight of the detachable battery storage unit (on the second direction side). Therefore, the posture of the work vehicle is further prevented from becoming unstable, so that the above-described work can be more smoothly performed.

DETAILED DESCRIPTION OF THE INVENTION

Hereinafter, a preferred embodiment of a work vehicle according to the present invention will be described in detail with reference to the accompanying drawings. Although the work vehicle exemplified in the present embodiment is a so-called mini hydraulic excavator, it is hereinafter simply referred to as a "hydraulic excavator".

Figure 1:
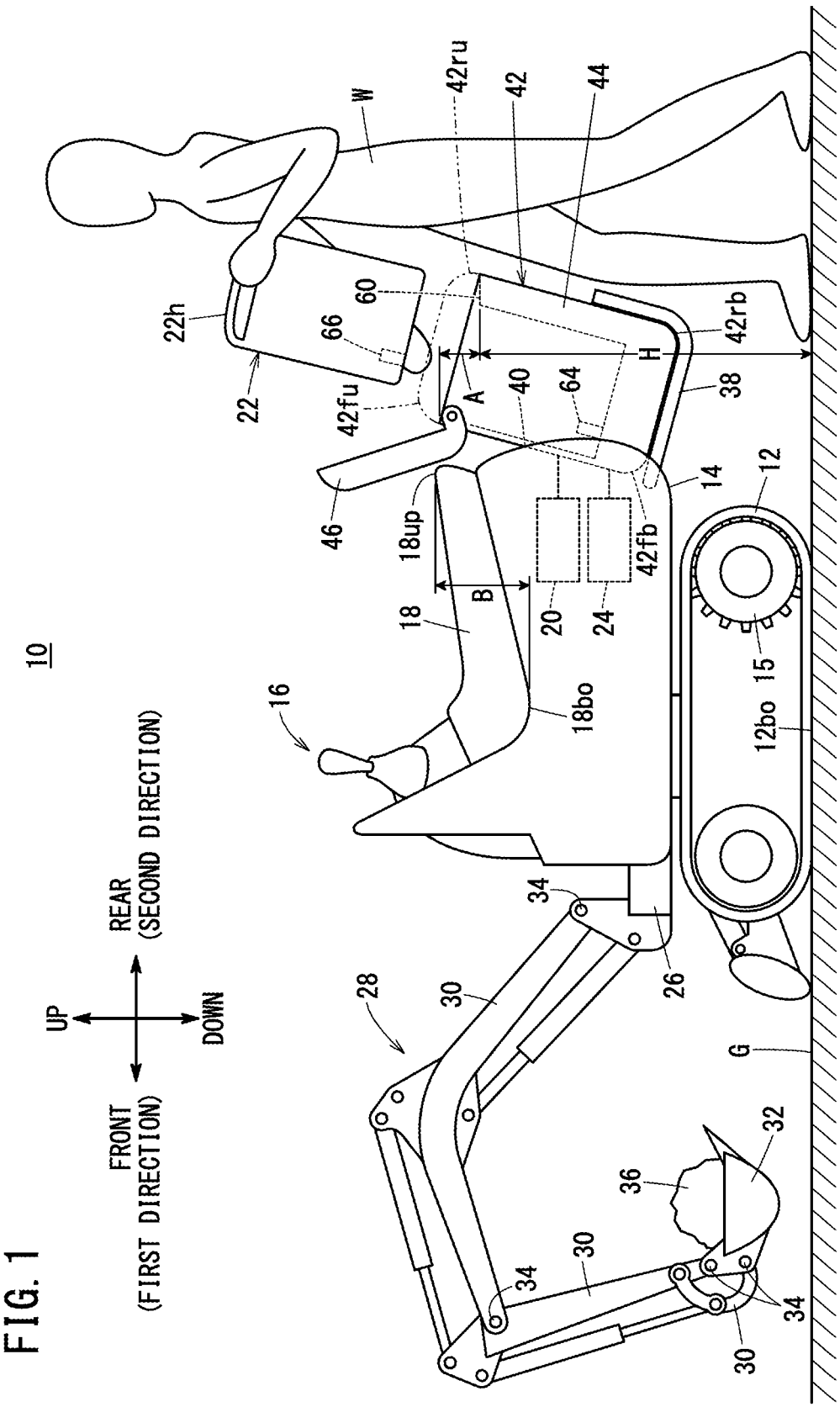
FIG. 1 is a schematic overall side view of a mini hydraulic excavator which is a work vehicle according to an embodiment of the present invention.

FIG. 1 is a schematic overall side view of a hydraulic excavator 10. The hydraulic excavator 10 includes a traveling unit 12 and a vehicle body 14 provided above the traveling unit 12. In this case, the traveling unit 12 is formed of a crawler including a drive sprocket 15, and is capable of rotating either leftward or rightward in FIG. 1. As the traveling unit 12 rotates in this way, the hydraulic excavator 10 travels straight to the left or right in FIG. 1. A ground contact portion 12*bo*, which is at the lowest position of the traveling unit 12, contacts the ground G.

An operation unit 16 operated by an operator W, and a seat 18 on which the operator W is seated, are provided on an upper portion of the vehicle body 14. Hereinafter, for convenience of description, a side on which the operation unit 16 is provided is defined as "front (forward)" or a "first direction", and a direction opposite thereto is defined as "rear (rearward)" or a "second direction". That is, the operation unit 16 is always located forward of the operator W seated on the seat 18 or in the first direction. Note that "front (forward)" or "first direction", and "rear (rearward)" or "second direction" are words representing directions. That is, for example, also at the position on the rear side of the operation unit 16, the operation unit 16 is located in the first direction (front side) when seen from that position, and the opposite direction (opposite side) thereto is the second direction (rear side).

The vehicle body 14 can turn with respect to the traveling unit 12. That is, when the vehicle body 14 is in the state shown in FIG. 1, the operator W seated on the seat 18 faces leftward. On the other hand, when the vehicle body 14 turns by 180° in a state where the traveling unit 12 is stopped, the operator W seated on the seat 18 faces rightward. In any case, it is needless to say that the operation unit 16 is positioned forward of the operator W. In other words, the first direction is leftward when the vehicle body 14 is in the state shown in FIG. 1, and is rightward when the vehicle body 14 turns by 180° from the state shown in FIG. 1. The second direction is opposite to this direction.

A motor 20 is housed in the vehicle body 14 so as to be slightly displaced rearward. The motor 20 is an electric drive source that is driven by receiving power supply from a detachable battery (hereinafter, also simply referred to as a "battery") 22, which will be described later. The motor 20 rotates the drive sprocket 15 to cause the crawler to rotate. Further, a power drive unit (PDU) 24 for converting DC power of the battery 22 into AC power is provided in the vicinity of the motor 20.

A coupling protrusion 26 is provided on a front wall surface (in other words, an outer wall surface facing in the first direction) of the vehicle body 14 so as to protrude further forward than the operation unit 16. A loading unit 28 is provided at the coupling protrusion 26. Accordingly, the loading unit 28 extends further forward (in the first direction) from the front wall surface of the vehicle body 14.

The loading unit 28 is operable with respect to the vehicle body 14. Specifically, the loading unit 28 includes a plurality of pivoting arms 30, and a bucket 32 provided on the pivoting arms 30 at the distal end. The adjacent pivoting arms 30 are connected to each other via a pivot shaft 34, and similarly, the pivoting arms 30 at the distal end and the bucket 32 are connected to each other via the pivot shafts 34. Upon receiving a command signal input by the operator W via the operation unit 16, each of the pivoting arms 30 and the bucket 32 receive driving electric power from the motor 20 and pivot about the pivot shafts 34.

For example, earth and sand, rocks, or the like are loaded on the bucket 32 as a loaded object 36. As the crawler rotates, the hydraulic excavator 10 can move forward in a state where the loaded object 36 is held on the bucket 32.

A stay 38 that protrudes further rearward than the seat 18 is provided at a lower portion of a rear wall surface (in other words, an outer wall surface facing in the second direction) of the vehicle body 14. The stay 38 is inclined toward the ground G as it is separated from the vehicle body 14. Further, a part of the rear wall surface is cut out to form an insertion opening 40.

Two battery cases 42 serving as detachable battery storage units are supported by the stay 38 so as to be arranged in parallel on the front side and the back side in a direction orthogonal to the plane of FIG. 1. Here, the lower surface of the stay 38 is located above the traveling unit 12. Therefore, a lower surface 42*bo* (see FIG. 2) of each of the battery cases 42 is also located above the traveling unit 12. That is, the entire battery case 42 is located above the traveling unit 12.

Further, since the stay 38 is inclined in the manner as described above, a front lower end 42*fb* and a front upper end 42*fu* of the battery case 42 are located above (higher than) a rear lower end 42*rb* and a rear upper end 42*ru*, respectively. That is, the battery case 42 is inclined downward (to be lower) from the front end (the end portion in the first direction) toward the rear end (the end portion in the second direction), in other words, is inclined so as to approach the ground G. Therefore, the front lower end 42*fb* is located on the first direction side, and the rear upper end 42*ru* is located on the second direction side.

The front lower end 42*fb* of the battery case 42 is inserted into the vehicle body 14 through the insertion opening 40. The other portions of the battery case 42 are exposed from the vehicle body 14 and extend rearward (in the second direction). Note that it is not essential for the front lower end 42*fb* of the battery case 42 to be inserted into the vehicle body 14, and the entire battery case 42 may be exposed from the vehicle body 14.

As the battery case 42, for example, a battery case may be adopted which is configured according to the battery case included in the battery storage device described in WO 2019/064593 A1 and is set so as to be able to house only one battery 22. That is, the main configuration of the battery case 42 is known, and therefore, detailed description and illustration thereof will be omitted.

Figure 2:
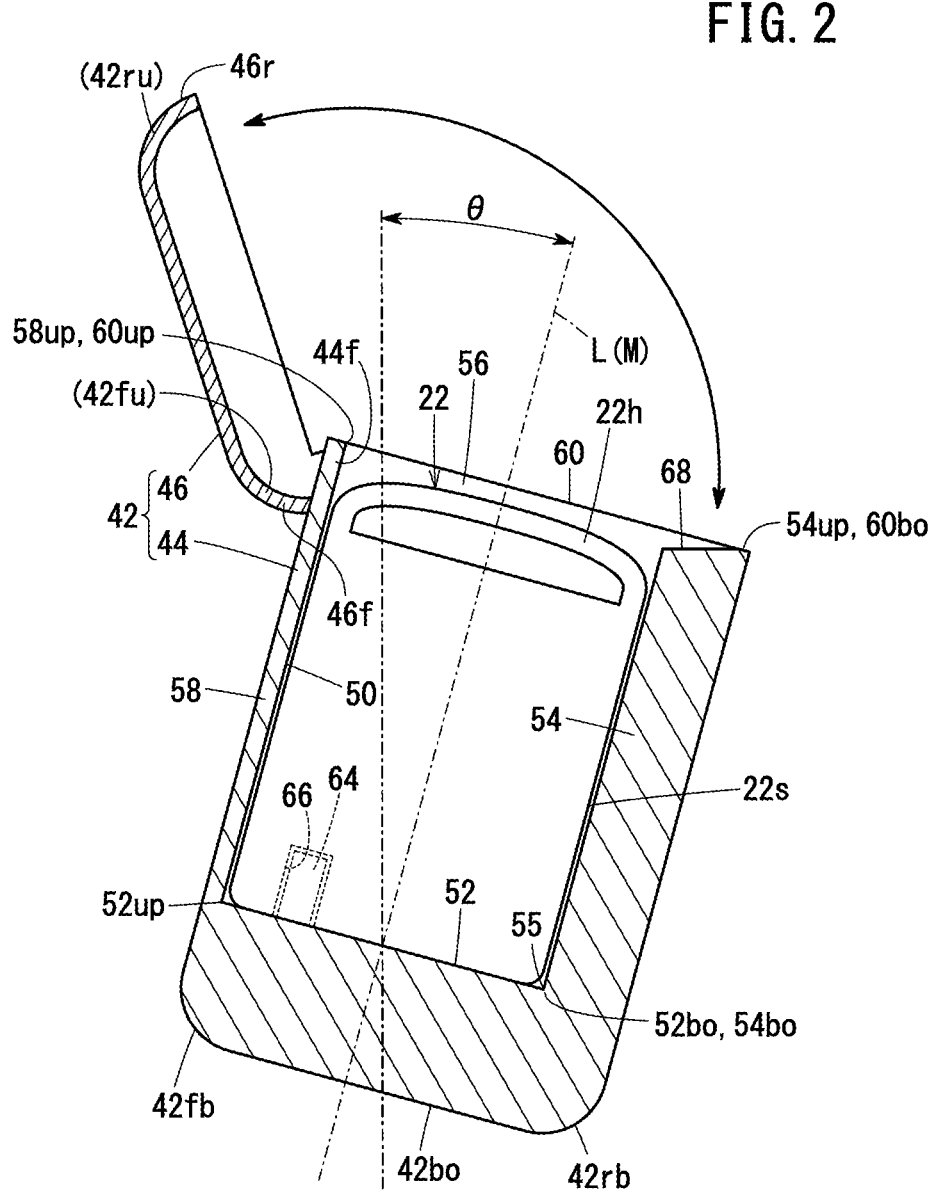
FIG. 2 is a schematic longitudinal cross-sectional view of a main portion of a battery case that is a detachable battery storage unit.
Figure 2:
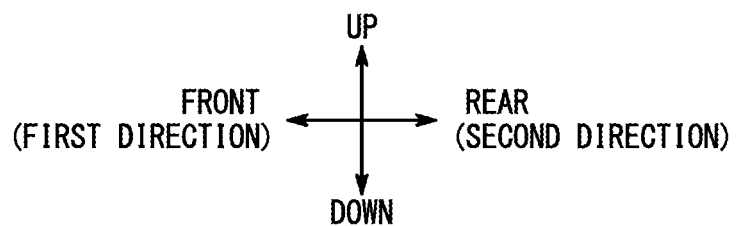

As shown in FIG. 2, the battery case 42 includes a case body 44, and a lid member 46 connected to the case body 44 via a hinge (not shown). The case body 44 has a substantially rectangular parallelepiped shape, and a housing portion 50 capable of housing the battery 22 is formed inside the case body 44. When the lid member 46 pivots so as to rise forward and upward, the battery case 42 is brought into an open state in which the housing portion 50 is visually recognized. On the other hand, when the lid member 46 pivots rearward and downward and covers the case body 44, the battery case 42 is brought into a closed state in which the housing portion 50 is hidden. The lid member 46 is locked to the case body 44 by a lock mechanism (not shown). In this case, the lid member 46 is maintained in the closed state unless the lock mechanism is released.

In the present embodiment, the battery 22 has a substantially rectangular parallelepiped shape such as shown in FIG. 1 of JP 2019-068720 A. Therefore, the housing portion 50 has a hole shape obtained by hollowing out a quadrangular prism. Specifically, in this case, the housing portion 50 is a space defined by one bottom wall 52 and four side walls.

One of the side walls is a lower side wall 54 facing downward, and a corner portion 55 is formed at the intersection of the lower side wall 54 and the bottom wall 52. Further, two of the side walls are lateral side walls 56 rising from the lower side wall 54, and the remaining one of the side walls is an upper side wall 58 connected to the two lateral side walls 56 and opposing the lower side wall 54. An opening 60 for inserting or removing the battery 22 is formed in an upper portion of the housing portion 50. That is, the battery case 42 includes the opening 60 oriented upward.

In the present embodiment, the battery 22 is attachable to and detachable from the battery case 42 (insertable into and removable from the housing portion 50). It goes without saying that the battery 22 passes through the opening 60 at the time of attachment and detachment. An axis line L of the housing portion 50 extends in a movement direction of the battery 22 when the battery 22 is inserted into or removed from the housing portion 50, that is, an attachment/detachment direction.

Since the battery case 42 is inclined in a state of being supported by the stay 38 as described above, the axis line L of the housing portion 50 is also inclined. In this case, the axis line L of the housing portion 50 is inclined upward (so as to be higher) from the first direction side toward the second direction side. An inclination angle $\theta$ of the axis line L of the housing portion 50 with respect to the vertical direction is preferably 10° to 45°. This is because, by setting in this manner, the battery 22 can be easily pushed into or pulled out from the housing portion 50.

The opening 60 is inclined so as to be substantially orthogonal to the axis line L of the housing portion 50. Specifically, the opening 60 includes an opening upper end 60*up* (highest portion) which is at the highest position, and an opening lower end 60*bo* (lowest portion) which is at the lowest position, the opening upper end 60*up* being located on the first direction side, and the opening lower end 60*bo* being located on the second direction side. Therefore, the opening 60 is oriented in the second direction. Note that the opening upper end 60*up* is substantially at the same position as an upper end 58*up* which is an end of the upper side wall 58 on the opening 60 side, and the opening lower end 60*bo* is substantially at the same position as an upper end 54*up* which is an end of the lower side wall 54 on the opening 60 side.

The opening lower end 60*bo* is located below a highest portion 18*up* of an upper surface of a seating surface of the seat 18. On the other hand, the opening upper end 60*up* is located at substantially the same height as the seating surface. Note that the opening upper end 60*up* may be located below the seating surface. In other words, at least a part of the opening 60 may be located below the highest portion 18*up*, but the entire opening 60 may be located below the highest portion 18*up*.

It is preferable that a height H of the opening lower end 60*bo* of the opening 60 from the ground contact portion 12*bo* is set at a position where it is not necessary to largely bend down when inserting or removing the battery 22, for example, based on the average height of an adult male living in a country or an area where the hydraulic excavator 10 is used. For example, the height H is preferably in a range of 80 cm to 120 cm, and more preferably in a range of 80 cm to 100 cm.

Incidentally, the stay 38 may be provided in a tilting unit so that the inclination angle $\theta$ of the axis line L with respect to the vertical direction can be changed. In this case, by tilting the stay 38 with the tilting unit, the height position H and the inclination angle $\theta$ can be appropriately changed according to the physique of the operator W. Therefore, the versatility of the hydraulic excavator 10 is enhanced. Note that, even when the tilt angle of the stay 38 is changed, the entire battery case 42 is located above the traveling unit 12.

The bottom wall 52 serves to stop the battery 22 inserted into the housing portion 50 and to position the battery 22. That is, the bottom wall 52 is a battery positioning portion. The bottom wall 52 is inclined so as to be substantially orthogonal to each of the side walls (the lower side wall 54, the two lateral side walls 56, and the upper side wall 58) and substantially parallel to the opening 60. Therefore, the bottom wall 52 includes a bottom upper end 52*up* which is at the highest position and a bottom lower end 52*bo* which is at the lowest position, the bottom upper end 52*up* being located on the first direction side, and the bottom lower end 52*bo* being located on the second direction side.

On the bottom wall 52, for example, a device-side connector 64 is provided at a position close to the upper side wall 58, more specifically, at a position closer to the bottom upper end 52*up* than a perpendicular line that is orthogonal to a line connecting the bottom upper end 52*up* and the bottom lower end 52*bo* and that passes through a midpoint of this line. The device-side connector 64 is electrically connected to a battery-side connector 66 provided at the bottom of the battery 22. Electric power of the battery 22 is supplied to the motor 20 (electric drive source) and electrical components such as the PDU 24, via the battery-side connector 66 and the device-side connector 64. In this way, the device-side connector 64 functions as a conduction connecting member. Since the configuration of the device-side connector 64 is described in detail in WO 2019/064593 A1, detailed illustration and description thereof will be omitted.

The lower side wall 54, which is one of the side walls, is inclined so as to be substantially parallel to the axis line L of the housing portion 50. In other words, the lower side wall 54 extends upward from the first direction side toward the second direction side. Therefore, a lower end 54*bo* (the bottom wall 52 side), which is at the lowest position, is positioned on the first direction side. On the other hand, the upper end 54*up* (the opening 60 side), which is at the highest position, is positioned on the second direction side. The weight of the battery 22 is applied as a load to the lower side wall 54. In other words, the lower side wall 54 is a battery support portion that receives the weight of the battery 22. The lower end 54*bo* of the lower side wall 54 is at the same position as the bottom lower end 52*bo*.

The lower side wall 54 has a slight thickness, and its upper end is substantially horizontally cut out. The cutout serves as a guide wall 68 for temporarily placing the battery 22 thereon to change the posture thereof.

The hinge connects a front upper end 44*f* of the case body 44 configured as described above, and a front lower end 46*f* of the lid member 46. Therefore, the lid member 46 can pivot such that a rear end 46*r* rises forward and upward as described above.

The hydraulic excavator 10 (the work vehicle) according to the present embodiment is basically configured as described above, and the operation and effect thereof will be described next.

The hydraulic excavator 10 is operated in a state where the battery 22 is housed in the housing portion 50 of each of the two battery cases 42 and the housing portion 50 is closed by the lid member 46. At this time, it is needless to say that the battery-side connector 66 is electrically connected to the device-side connector 64. Accordingly, electric power from the battery 22 is supplied to the motor 20, which is an electric drive source, and various electrical components such as the PDU 24.

When the operator W seated on the seat 18 appropriately operates the operation unit 16, the drive sprocket 15 constituting the traveling unit 12 rotates and the crawler starts rotating. Along therewith, the hydraulic excavator 10 moves forward, for example, to the left in FIG. 1. After arriving at the work site where excavation or the like is performed, the traveling unit 12 may be stopped to stop the forward movement of the hydraulic excavator 10.

Next, when the operator W appropriately operates the operation unit 16, the loading unit 28 is operated to perform excavation. That is, the pivoting arms 30 and the bucket 32 are appropriately operated to excavate a part of the ground G. As a result, earth and sand, rocks, and the like are collected in the bucket 32. In other words, the loaded object 36 such as earth and sand or rocks is loaded on the bucket 32. Since earth and sand, rocks, and the like are considerably heavy objects, a large load acts on the front side (in the first direction) of the hydraulic excavator 10.

The hydraulic excavator 10 is small, and the vehicle body 14 is relatively lightweight. For this reason, if the weight of the loaded object 36 is excessively large, there is a concern that the center of gravity is displaced to the front side (in the first direction) and the posture of the hydraulic excavator 10 becomes unstable.

In the present embodiment, two battery cases 42 are disposed on the second direction side of the vehicle body 14, which is opposite to the first direction side, and the batteries 22 are stored in the two battery cases 42, respectively. Therefore, the weight of the battery cases 42 and the batteries 22 is applied as a load to the rear portion of the vehicle body 14. Accordingly, the weight of the loading unit 28 on which the loaded object 36 is loaded, that is, the weight of the front side of the vehicle body 14 (the loading unit 28 on which the loaded object 36 is loaded) and the weight of the rear side of the vehicle body 14 (the battery cases 42 and the batteries 22) are substantially balanced. Thus, the posture of the hydraulic excavator 10 is prevented from becoming unstable when the loaded object 36 is loaded on the bucket 32. As a result, excavation work, transportation work, and the like can be smoothly performed.

In addition, each of the battery cases 42 and each of the batteries 22 are inclined with respect to the vertical direction such that the upper portion of the housing portion 50 where the opening 60 is formed extends in the second direction. In this case, the center of gravity of the battery case 42 and the center of gravity of the battery 22 can be more easily separated from the loading unit 28 toward the second direction side, compared to a state where the battery case 42 is placed such that the lower surface 42$bo$ thereof is horizontal (a state where the battery case 42 is not inclined). This also contributes to balancing the weight of the front side of the vehicle body 14 (the loading unit 28 on which the loaded object 36 is loaded) and the weight of the rear side of the vehicle body 14 (the battery cases 42 and the batteries 22). That is, the posture of the hydraulic excavator 10 is further prevented from becoming unstable.

Note that the inclination direction of each of the battery cases 42 may be opposite to that in FIG. 1. That is, the axis line L of the housing portion 50 can be inclined with respect to the vertical direction such that the opening 60 is oriented upward, the upper portion in which the opening 60 is formed is extended in the first direction, and the lower portion including the lower surface 42$bo$ of the battery case 42 is extended in the second direction. In this case, the battery case 42 is inclined downward from the first direction side toward the second direction side. Also in this case, the center of gravity of the battery case 42 and the center of gravity of the battery 22 can be more easily separated from the loading unit 28 toward the second direction side, compared to a state where the battery case 42 is placed such that the lower surface 42$bo$ thereof is horizontal (a state where the battery case 42 is not inclined).

In addition, the battery cases 42 are always positioned on the back side (rear side) of the operator W no matter how much the vehicle body 14 turns. That is, the battery cases 42 do not block the field of view of the operator W. Therefore, the situation where the battery cases 42 interfere with the work is avoided.

In addition, the battery cases 42 are positioned on the opposite side of the vehicle body 14 from the loading unit 28. Therefore, even if earth and sand or the like loaded on the bucket 32 are scattered by wind, it is difficult for the earth and sand or the like to reach the battery cases 42. Thus, the adhesion of earth and sand or the like to the battery cases 42, that is, the contamination of the battery cases 42 is suppressed.

It is assumed that the hydraulic excavator 10 is used in rainy weather. Although the gap between the case body 44 and the lid member 46 is sealed by a seal member, there is a concern that rainwater or the like may enter the battery case 42 when the seal member deteriorates over time.

Here, the lower side wall 54 of the housing portion 50 is inclined so as to be oriented in the first direction from the upper end 54$up$ toward the lower end 54$bo$, and the bottom wall 52 is inclined so as to be oriented in the first direction from the bottom lower end 52$bo$ which is the lower end (at the lowest position) toward the bottom upper end 52$up$ which is the upper end (at the highest position). Therefore, rainwater or the like is temporarily stored in the corner portion 55 formed by the lower side wall 54 and the bottom wall 52. As described above, the device-side connector 64 and the battery-side connector 66 are located on the bottom wall 52 at a position closer to the bottom upper end 52$up$ than a perpendicular line that is orthogonal to a line connecting the bottom upper end 52$up$ and the bottom lower end 52$bo$ and that passes through a midpoint of this line. That is, both connectors 64 and 66 are close to the highest side on the bottom wall 52. Therefore, both connectors 64 and 66 are prevented from being immersed in water. The same applies to a case where dew condensation occurs in each of the battery cases 42. As described above, by inclining the housing portion 50, it is also possible to obtain an advantage that the device-side connector 64 and the battery-side connector 66 can be protected from rainwater, condensed water, or the like.

When the excavation work, the operation of the loading unit 28, and the traveling of the hydraulic excavator 10 are repeated, the capacity of the battery 22 decreases. In this case, the operator W replaces the battery 22. For this purpose, the hydraulic excavator 10 may be caused to travel to a charging station, or the battery 22 may be conveyed to the hydraulic excavator 10.

The operator W first releases the locking (locking of the lid member 46) by the lock mechanism and then pivots the lid member 46 to bring the battery case 42 into the open state. In accordance therewith, the opening 60 of the housing portion 50 and the upper end portion of the battery 22 are visually recognized. Next, the operator W grips a grip portion 22h provided at the upper end portion of the battery 22 and pulls up the battery 22 along the axis line L of the housing portion 50.

Here, the range of a height position A of the opening 60 of the housing portion 50 from the opening lower end 60bo to the opening upper end 60up overlaps, at least partially, the range of a height position B from the highest portion 18up to a lowest portion 18bo of the upper surface of the seating surface of the seat 18. In this manner, the height position A of the opening 60 is set such that the operator W can grip the battery 22 without largely bending down. In addition, since the height position A in at least a part of the range thereof is located below the highest portion 18up of the upper surface of the seating surface of the seat 18, and the opening 60 is oriented in the second direction, it is easy for the operator W to visually recognize the housing portion 50 and the battery 22.

Moreover, since the housing portion 50 is inclined such that the inclination angle θ of the axis line L with respect to the vertical direction is 10° to 45°, the opening 60 substantially faces the operator W. Further, the lower side wall 54 that defines the housing portion 50 receives the weight of the battery 22. According to the features described above, the operator W can easily pull up the battery 22.

Furthermore, since the height H of the opening lower end 60bo of the opening 60 from the ground contact portion 12bo of the traveling unit 12 is low, the operator W does not need to lift up the battery 22 to a high position. Therefore, the burden on the operator W is reduced. In particular, when the height H is preferably set to be equal to or greater than 80 cm and equal to or less than 120 cm, and more preferably equal to or greater than 80 cm and equal to or less than 100 cm, the burden can be greatly reduced.

Furthermore, since the opening 60 is oriented in the second direction, the situation where the battery 22 pulled out from the housing portion 50 interferes with the seat 18 or the like is avoided.

Next, the operator W lifts up the charged battery 22 and brings it close to the opening 60. Since the lid member 46 pivots forward and upward, the situation where the lid member 46 interferes with the battery 22 is avoided. In addition, as described above, since the operator W does not need to lift up the battery 22 to the high position, the burden on the operator W is reduced.

Figure 3:
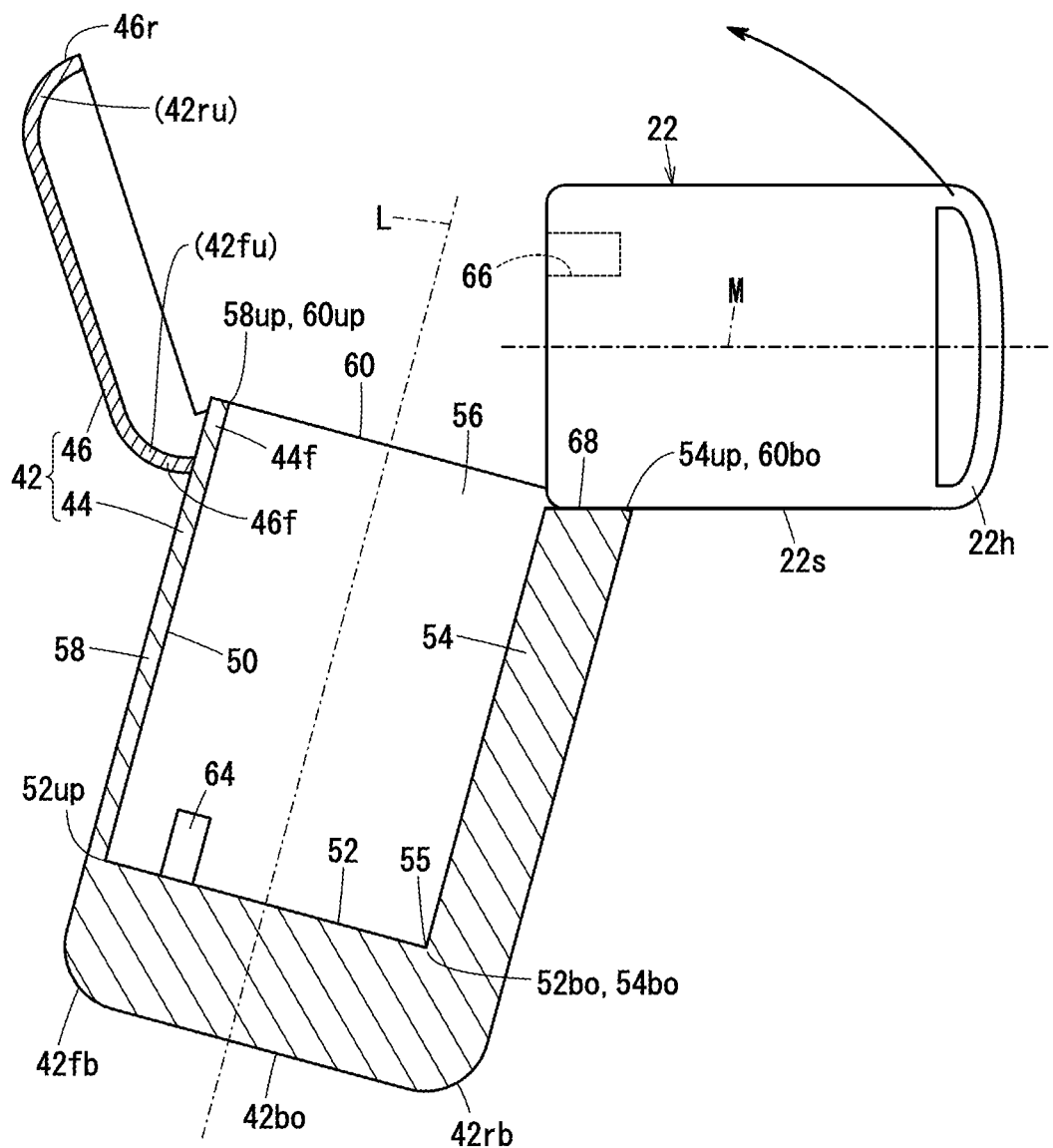
FIG. 3 is a schematic longitudinal cross-sectional view of a main portion showing a state where a detachable battery is temporarily stopped in the vicinity of an opening of the battery case.

At this point of time, there is no problem if the battery 22 is in the lying posture in which an axis line M of the battery 22 extends in the horizontal direction. Here, the guide wall 68 is provided at the opening 60 of the housing portion 50. As shown in FIG. 3, the operator W can place, on the guide wall 68, a lower end of a side surface 22s of the battery 22 that is in the lying posture, the side surface 22s facing the guide wall 68.

Figure 4:
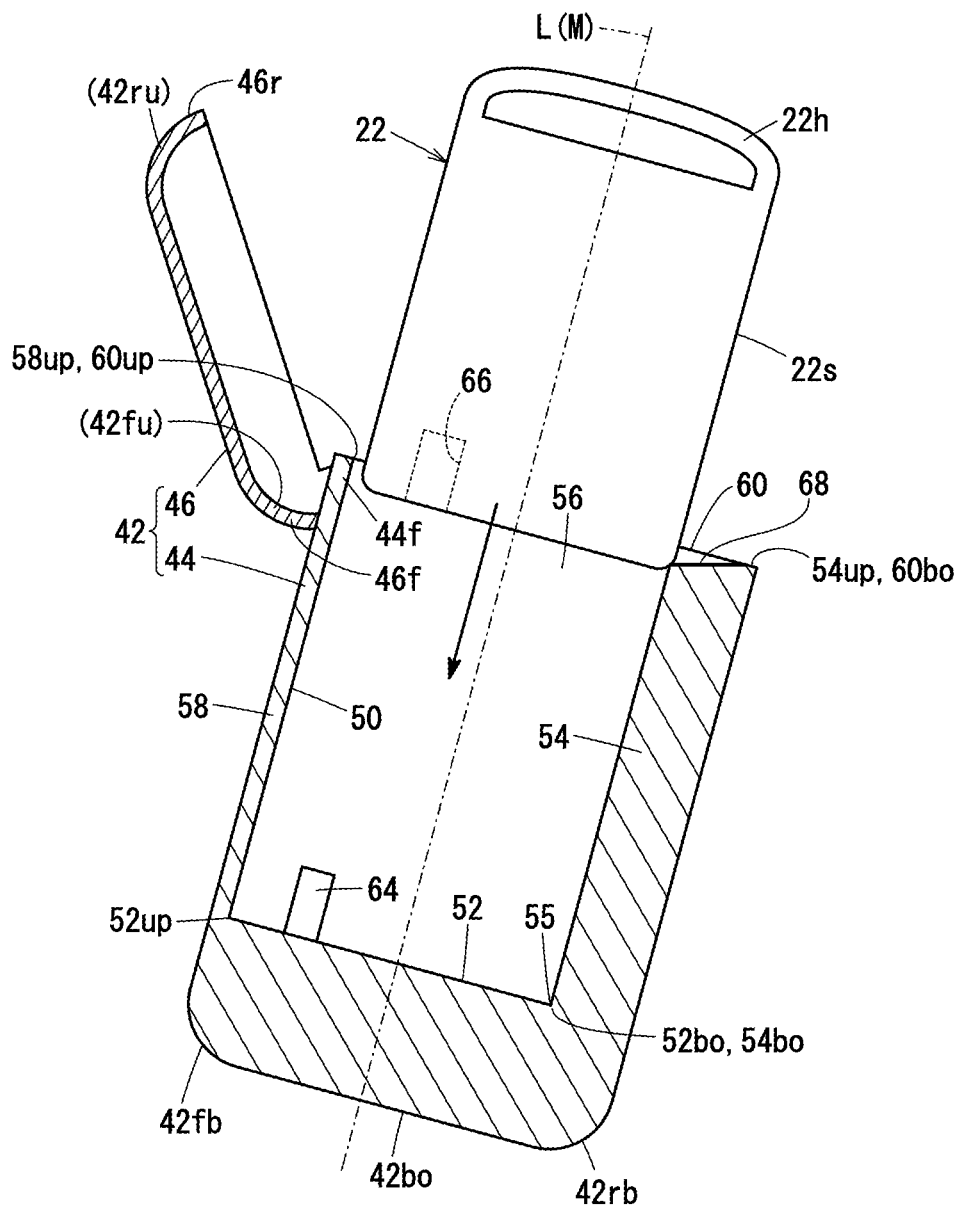
FIG. 4 is a schematic longitudinal cross-sectional view of a main portion showing a state where the posture of the detachable battery is changed from that in FIG. 3.
Figure 4:
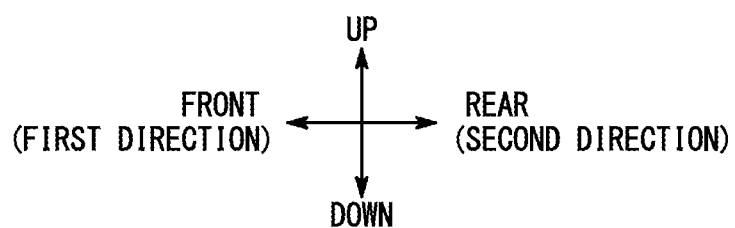

From this state, the operator W pivots the battery 22 about the guide wall 68 such that the battery 22 slightly stands up, and changes the posture of the battery 22 from the lying posture to the inclined posture as shown in FIG. 4. As a result, the axis line L of the housing portion 50 and the axis line M of the battery 22 become parallel to each other. That is, the axis line M of the battery 22 extends in the attachment/detachment direction.

Further, as the battery 22 becomes inclined, the bottom portion thereof slides on the guide wall 68, and the side surface 22s of the inclined battery 22 comes into contact with the lower side wall 54 of the housing portion 50. Thereafter, the battery 22 easily moves toward the bottom wall 52 by its own weight while being supported by the lower side wall 54. In this manner, by inclining the battery case 42 and the housing portion 50, the work of inserting the battery 22 into the housing portion 50 is facilitated compared to a case where the housing portion 50 extends in the vertical direction or the horizontal direction.

The present invention is not particularly limited to the above-described embodiment, and various modifications can be made without departing from the gist of the present invention.

For example, the traveling unit 12 may be wheels. In addition, the work vehicle is not limited to the hydraulic excavator 10, and may be a forklift or a tractor shovel including a wheel loader and a crawler loader.

Further, the detachable battery storage unit may be constituted by a frame member.

REFERENCE SIGNS LIST

10: hydraulic excavator
12: traveling unit
14: vehicle body
16: operation unit
18: seat
20: motor
22: detachable battery
24: power drive unit
28: loading unit
30: pivoting arm
32: bucket
34: pivot shaft
36: loaded object
42: battery case
44: case body
46: lid member
50: housing portion
52: bottom wall
54: lower side wall
56: lateral side wall
58: upper side wall
60: opening
64: device-side connector
66: battery-side connector
68: guide wall
G: ground
L, M: axis line
W: operator

The invention claimed is:

1. A work vehicle comprising:
an electric drive source driven by electric power;
a traveling unit driven by the electric drive source;
a vehicle body on which the traveling unit is provided;
a seat on which an operator is seated;
a loading unit that is provided on the vehicle body so as to extend more in a first direction than a first-direction-side end portion of the seat, the loading unit being configured to allow a loaded object to be loaded thereon, the loading unit being operable with respect to the vehicle body; and
a detachable battery storage unit provided on the vehicle body so as to extend more in a second direction that is an opposite direction to the first direction from a second-direction-side end portion of the vehicle body
wherein the detachable battery storage unit includes:
a housing portion that houses, in a detachable manner, a detachable battery configured to supply electric power to the electric drive source, and an opening that is formed in an upper portion of the housing portion, the detachable battery being inserted or removed through the opening, and in a state where the detachable battery storage unit is positioned and fixed on a portion of the vehicle body that faces in the second direction, an axis line of the housing portion that extends in a battery attachment/detachment direction is inclined with respect to a vertical direction so as to be oriented in the first direction or the second direction, and the detachable battery storage unit includes a first-direction-side end portion located more in the second direction than a second-direction-side end portion of the traveling unit.

2. The work vehicle according to claim 1, wherein the axis line and the opening are oriented in the second direction.

3. The work vehicle according to claim 1, wherein the detachable battery storage unit is disposed above the traveling unit.

4. The work vehicle according to claim 3, wherein a lowest position on the detachable battery storage unit on a side of the first direction is located above a lowest position on the detachable battery storage unit on a side of the second direction.

5. The work vehicle according to claim 1, wherein at least a part of the opening is located below a seat surface of the seat.

6. The work vehicle according to claim 5, wherein at least a part of the opening from a highest portion of the opening at a highest position thereof to a lowest portion of the opening at a lowest position thereof is positioned within a range from a highest portion of the seat at a highest position thereof to a lowest portion of the seat at a lowest position thereof.

7. The work vehicle according to claim 1, wherein a distance from a lowest position on the traveling unit to a lowest portion of the opening at a lowest position thereof is 80 cm to 120 cm, and an inclination angle of the axis line of the housing portion with respect to a vertical direction is 10° to 45°.

8. The work vehicle according to claim 1, wherein the detachable battery storage unit includes, in the housing portion, a battery support portion that is inclined so as to extend along the axis line of the housing portion and that is configured to support the detachable battery.

9. The work vehicle according to claim 8, wherein the detachable battery storage unit includes, in the housing portion, a battery positioning portion that is provided so as to be orthogonal to the battery support portion and that is configured to position the detachable battery, and a conduction connecting member that is electrically connected to the detachable battery is provided in proximity to a highest position on the battery positioning portion.

10. The work vehicle according to claim 8, wherein the detachable battery storage unit includes a guide wall configured to guide the detachable battery to the support portion, and the guide wall is a cutout formed in a manner that allows a posture of the detachable battery to change from a lying posture extending in a horizontal direction to an inclined posture along an inclination of the housing portion.

11. The work vehicle according to claim 1, wherein the detachable battery storage unit includes a lid member, and the lid member is pivoted, thereby opening and closing the opening.

* * * * *